United States Patent [19]
Wheary

[11] Patent Number: 5,533,264
[45] Date of Patent: Jul. 9, 1996

[54] APPARATUS FOR STRIPPING CABLE

[75] Inventor: David Wheary, Somerset, N.J.

[73] Assignee: AT&T Corp., Murray Hill, N.J.

[21] Appl. No.: 281,969

[22] Filed: Jul. 28, 1994

[51] Int. Cl.⁶ .................................................. B26B 27/00
[52] U.S. Cl. .............................................. 30/90.1; 30/91.2
[58] Field of Search ................................ 30/90.1, 91.2, 30/96, 100, 101, 102

[56] References Cited

U.S. PATENT DOCUMENTS

| | | | |
|---|---|---|---|
| 1,256,799 | 2/1918 | Hime | 30/100 |
| 3,082,523 | 3/1963 | Modes et al. | 30/90.1 |
| 3,535,785 | 10/1970 | Matthews | 30/91.2 |
| 3,763,559 | 10/1973 | Axbjer | 30/100 |

Primary Examiner—Douglas D. Watts

[57] ABSTRACT

A cable stripper is provided for removing metallic or non-metallic cable sheathing. The cable stripper includes a cutter which is adjustable for making circular or radial cuts in the cable sheathing. The cable stripper is adjustable to accommodate a wide range of cable diameters. The cable stripper can be installed at any location along a cable. The cable stripper provides means for measuring continuity between the cutting element and a metallic cable shield.

18 Claims, 5 Drawing Sheets

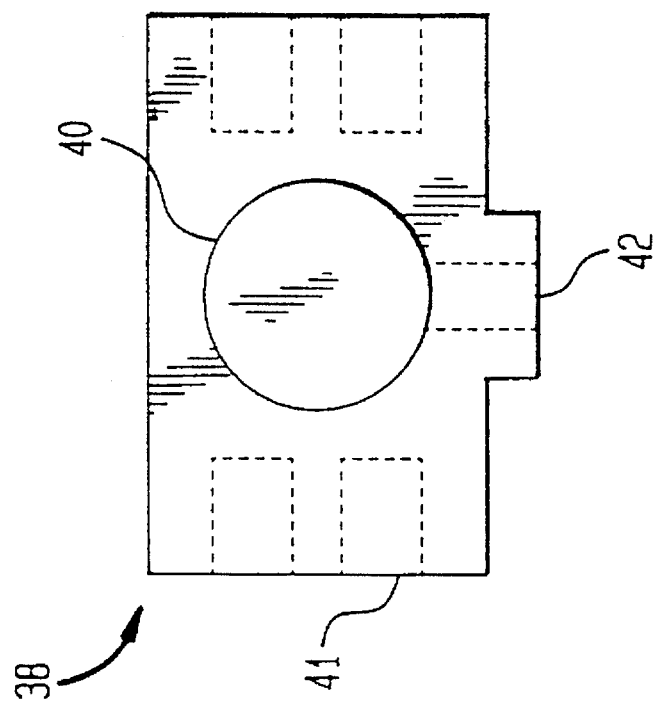
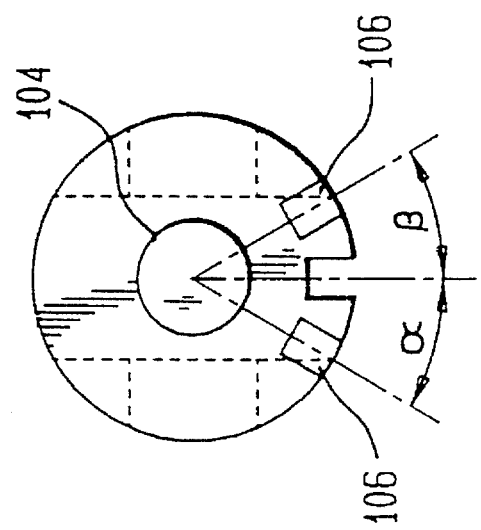

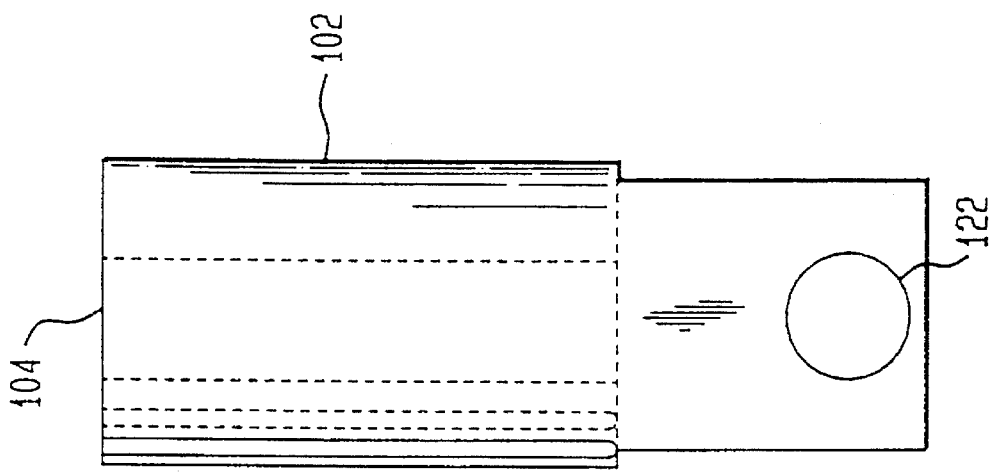
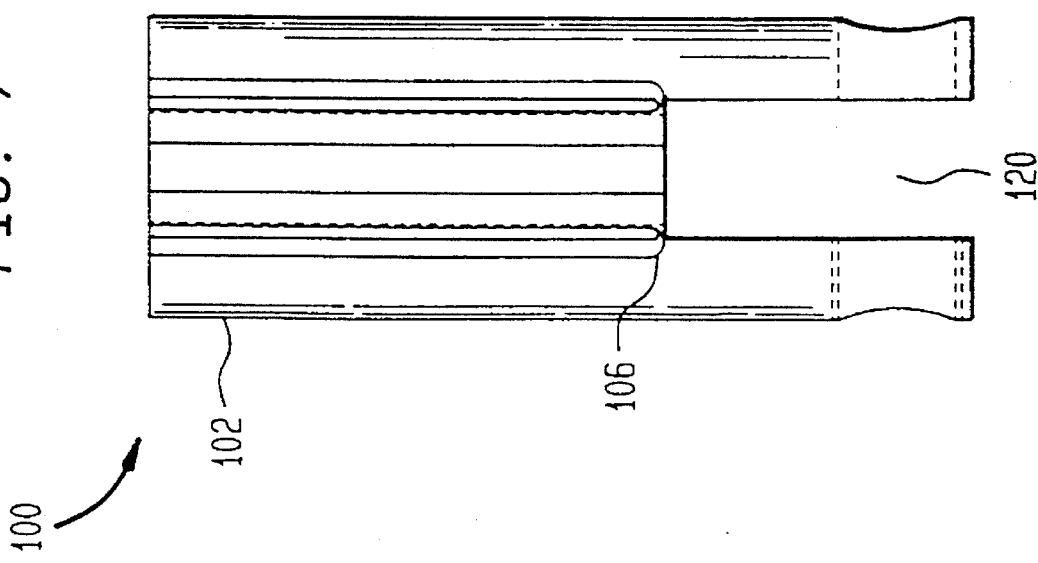

APPARATUS FOR STRIPPING CABLE

STATEMENT AS TO RIGHTS TO INVENTIONS MADE UNDER FEDERALLY-SPONSORED RESEARCH AND DEVELOPMENT

Part of the work performed during development of this invention utilized U.S. Government funds. The U.S. Government has certain rights in this invention.

BACKGROUND OF THE INVENTION

1. Field of the Invention

The present invention relates generally to cable Strippers and more particularly is directed toward an improved cable stripper especially designed for but not limited to removing cable sheathing of poly and/or metallic composition.

2. Description of Related Art

Effective removal of cable sheathing has posed a problem for a long time. The primary difficulty associated with removing the sheathing of poly-sheathed cables lies in removal of the sheathing without causing damage to the conductors contained inside. Conventional methods of poly-sheathing removal generally involved free-hand cutting of the sheathing with a knife or blade, followed by manual peeling of the sheathing away from the cable and then cutting off the loosened sheathing. During this process, however, damage to the conductors underneath the sheathing was a likely, although undesired, side-effect.

The development of cables with metallic sheathing has further complicated the sheathing removal problem. With metallic sheathing, conventional sheathing removal methods have proved inadequate. Technicians have been forced to resort to brute force (e.g., chisel and hammer) methods of sheathing removal. In some instances, technicians have attempted to utilize conventional pipe-cutters to make an initial circular cut in the sheathing and then resorted again to brute-force peeling methods to remove the sheathing. Frequently these methods also resulted in damage to the cable conductors. In addition, where pipe-cutters have been employed, the limited adjustability of such cutters has necessitated the purchase of a large number of cutters to accommodate the wide range of cable diameters currently in use.

Some tools have been developed which can be used to make a cut parallel to the longitudinal axis of the table, but even these tools do not overcome the aforementioned difficulties. First, the parallel cutting tools do not permit the making of a circular cut, hence at the very least two cutting tools (e.g., both a circular cutter and a parallel cutter) are required. Second, these parallel cutting tools are not adjustable over a wide range of diameters. Therefore, to effectively accommodate the wide range of cable diameters in use, a number of these tools would be required.

Another difficulty associated with conventional tools is that they can only be installed onto the end of a cable. This limitation prevents the removal of cable sheathing "midspan" which is often required in certain applications.

The difficulty of sheathing removal, the possibility of conductor damage and the inability to remove sheathing mid-span are real problems which have not been overcome by the prior art. Therefore, there exists a need for a cable stripper which would permit removal of cable sheathing of any composition, especially commonly used poly or metallic sheathing, protect against undesired damage to the cable conductors during sheathing removal and at the same time be installable at any location along a cable (e.g., midspan or near an end). Similarly, the need for a cable stripper capable of being adjusted to accommodate cables of a wide range of diameters has not been met by the prior art.

In addition to the difficulties associated with striping cables with poly or metallic sheathing, an additional problem exists when shielded cable must be stripped. Shielded cable may typically be formed of layers of conductive (e.g., metallic) material sandwiched between layers of non-conductive (e.g., poly) sheathing.

It is sometimes desirable to remove only a single layer of poly sheathing (e.g., to gain access to the outermost shield layer) without cutting into lower shield layers. Conventional cable strippers have not addressed this need, and technicians have resorted to trial and error attempts to remove single shield layers. Therefore, there exists a need for a cable stripper which would permit controlled removal of a single shield layer without damaging lower shield layers.

SUMMARY OF THE INVENTION

To achieve the foregoing and other objects, and in accordance with the purposes of the present invention, as embodied and broadly described herein, the cable stripper of the present invention was devised. The cable stripper of the present invention comprises a cutting element, a cutting element housing, a cutting element guide and a cutting element adjustment assembly. The cutting element housing supports the cutting element and the cutting element guide has an opening of adjustable diameter for receiving a cable. The cutting element adjustment assembly is disposed within the cutting element housing, and permits variable adjustment of the depth of the cutting element with respect to the surface of a cable, and angular adjustment of the cutting element with respect to the longitudinal axis of the cable.

The cutting element may further comprise a wheel sharpened along its circumference. The cutting element housing may further comprise a first hole, a second hole, a third hole and a support block. The first hole and the support block are disposed in the cutting element housing. The second hole and the third hole are disposed in the support block, with the third hole intersecting the second hole. The cutting element housing may further comprise a U-shaped frame, with the cutting element guide attached to the distal ends of the U-shaped frame. The cutting element adjustment assembly may further comprise a cutter carrier, a fourth hole, a plurality of grooves disposed in the cutter carrier along a portion of its length, a first and second threaded fastener, and a first and second bushing. The cutter carrier is disposed within the second hole of the support block, the cutting element is disposed on one end of the cutter carrier; and the fourth hole is disposed on the other end of the cutter carrier. The first threaded fastener extends through the first hole of the cutting element housing into the fourth hole of the cutter carrier permitting vertical adjustment of the cutting element with respect to the surface of a cable. The first bushing is disposed between the first threaded fastener and the upper surface of the cutting element housing. The second bushing is disposed between the first threaded fastener and the lower surface of the cutting element housing. The second threaded fastener extends through the third hole of the support block whereby the second threaded fastener can be selectively received within one of the plurality of grooves to permit angular adjustment of the cutting element with respect to the longitudinal axis of the cable. The first threaded fastener may further comprise a thumbscrew, and the second threaded fastener may further comprise a thumbscrew.

The cutting element guide may further comprise a chain with one end connected to the cutting element housing, a chain tensioner connected to the cutting element housing, and a slot formed in the chain tensioner. The slot can be selectively engaged with the chain to form a loop of adjustable diameter to accommodate cables of various diameters.

The cutting element guide may further comprise a second slot formed in the chain tensioner which can be selectively engaged with the chain to form a loop of adjustable diameter to accommodate cables of various diameters. The chain may further comprise a plurality of chain links, with each chain link including a roller carrier, a roller, a roller pin rotatably anchoring the roller within the roller carrier to form a chain link, and a link side plate connecting a plurality of chain links to form the chain. The chain may further comprise a second roller, a second roller pin rotatably anchoring the second roller within the roller carrier to form a chain link, and a second link side plate connecting a plurality of chain links to form the chain.

The chain tensioner may further comprise a support plate, a slidable backstop, a roller pin mating plate, a threaded receptacle, a third threaded fastener and a third bushing. The support plate is connected at one end to the cutting element housing, the slidable backstop is connected to the other end of the support plate, the roller pin mating plate is pivotally connected to the support plate, the threaded receptacle is connected to one end of the roller pin mating plate, the third threaded fastener extends through the slidable backstop into the threaded receptacle, and the third bushing is disposed between the third threaded fastener and the slidable backstop. The third threaded fastener may further comprise a thumbscrew.

The chain tensioner may further comprise a second support plate and a second roller pin mating plate. The second support plate is connected at one end to the cutting element housing and at the other end to the slidable backstop. The slidable backstop bridges the first support plate and the second support plate. The second roller pin mating plate is pivotally connected to the second support plate and is connected at one end to the threaded receptacle. The threaded receptacle bridges the first roller pin mating plate and the second roller pin mating plate.

The cutting element housing may further comprise a fifth hole disposed in the cutting element housing permitting a test probe to be inserted through the fifth hole to contact the cutting element adjustment assembly to make a continuity measurement between the cutting element adjustment assembly and the metallic shield of a cable.

Alternatively, the cable stripper of the present invention comprises a cutting element, means for supporting the cutting element, means for guiding the cutting element around the surface of a cable, means for tightening the cutting element against the surface of a cable, and means for adjusting the depth and angle of the cutting element with respect to a cable whereby a spiral cut can be made along the longitudinal axis of the cable permitting removal of the sheathing of the cable.

Alternatively, the cable stripper 6f the present invention comprises a cutting element, a first means, a cutting element housing, a cutting element guide, and a cutting element adjustment assembly. The first means permits an electrical connection to be made between the cutting element and a test probe whereby an electrical circuit can be formed between the cutting element and a metallic cable shield. The cutting element housing supports the cutting element and the cutting element guide has an opening of adjustable diameter for receiving a cable. The cutting element adjustment assembly is disposed within the cutting element housing, and permits variable adjustment of the depth of the cutting element with respect to the surface of a cable.

The first means may further comprise a first hole disposed in the cutting element housing permitting a test probe to be inserted through the first hole to contact the cutting element adjustment assembly to make a continuity measurement between the cutting element adjustment assembly and the metallic shield of a cable.

BRIEF DESCRIPTION OF THE FIGURES

The accompanying drawings, which are incorporated in and form a part of the specification, illustrate an embodiment of the present invention and, together with the description, serve to explain the principles of the invention. In the drawings:

FIG. 5 is a top view of a support block of a cable stripper in accordance with the present invention;

FIG. 6 is a top view of a cutter carrier of a cable stripper in accordance with the present invention;

FIG. 7 is a perspective view of a cutter carrier of a cable stripper in accordance with the present invention;

FIG. 8 is a side view of a cutter carrier of a cable stripper in accordance with the present invention;

DETAILED DESCRIPTION OF THE PREFERRED EMBODIMENTS

The accompanying drawings illustrate a cable stripper incorporating the features of the present invention. The opening of adjustable diameter in the cutting element guide permits the cable stripper to be installed on cables of various diameters and at any location along the cable (e.g., mid-span or near an end). The cutting element adjustment assembly permits the depth and angle of the cutting element to be adjusted relative to any cable the cable stripper is installed on. The cutting element housing permits a continuity measurement to be made between the cutting element and the shield layers of a shielded cable the cable stripper is installed on.

Figure 1:
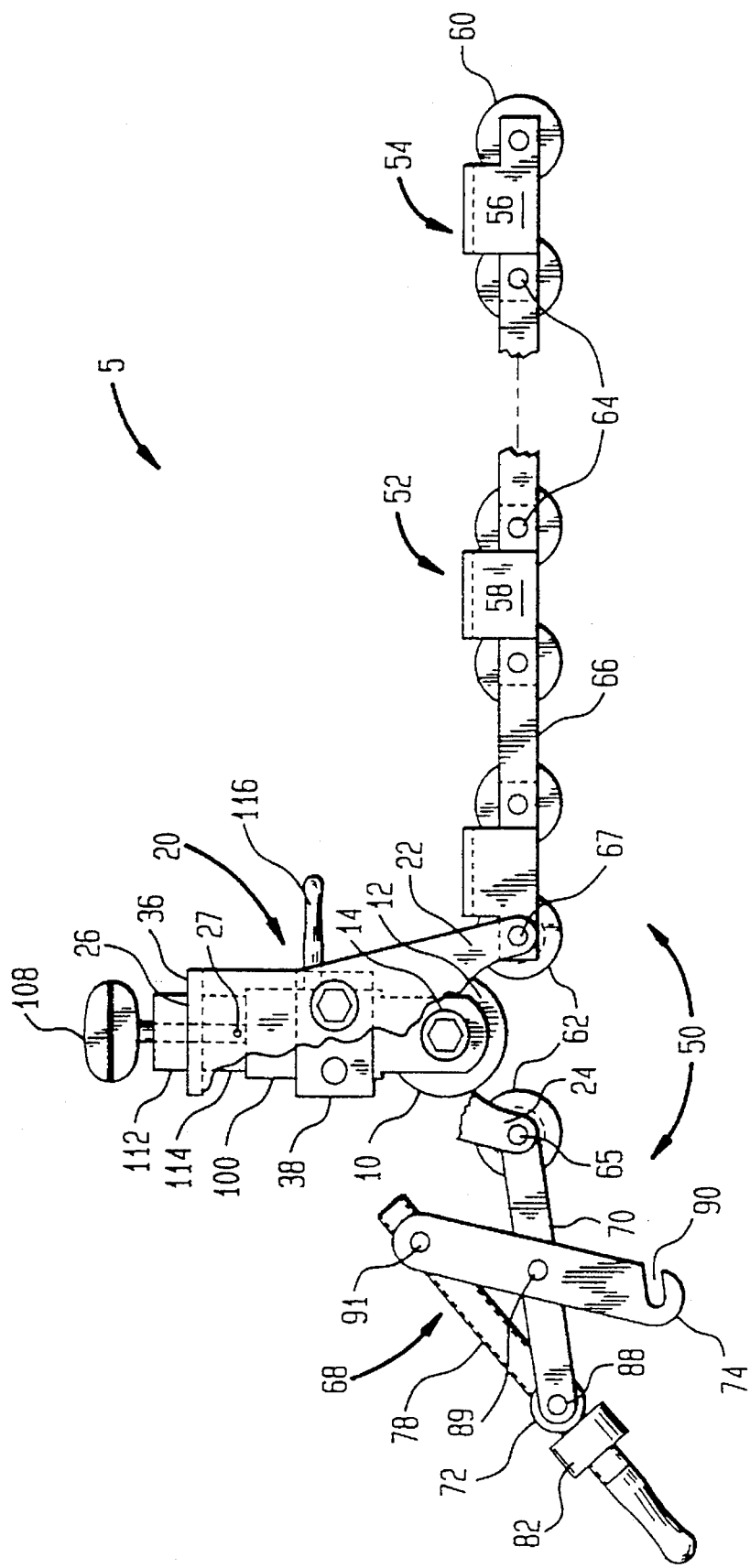
FIG. 1 is a perspective view of a cable stripper in accordance with the present invention.

Referring to the accompanying drawings, FIG. 1 is a perspective view of the side of a cable stripper 5 in accordance with the present invention. Cable stripper 5 includes a cutting element 10, a cutting element housing 20, a cutting element guide 50, and a cutting element adjustment assembly 100, each of which is discussed below in greater detail.

Figure 4:
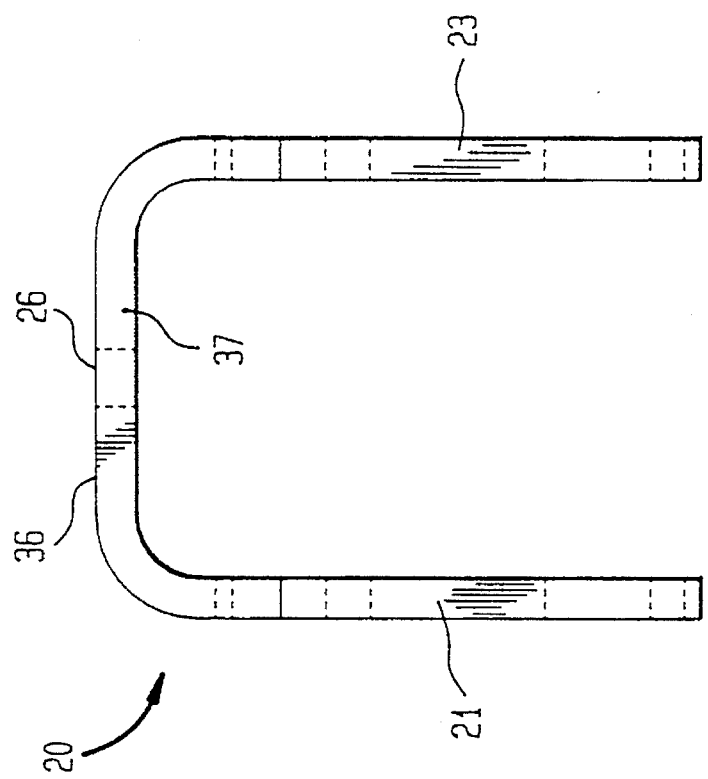
FIG. 4 is an end view of a U-shaped frame of a cable stripper in accordance with the present invention.
Figure 3:
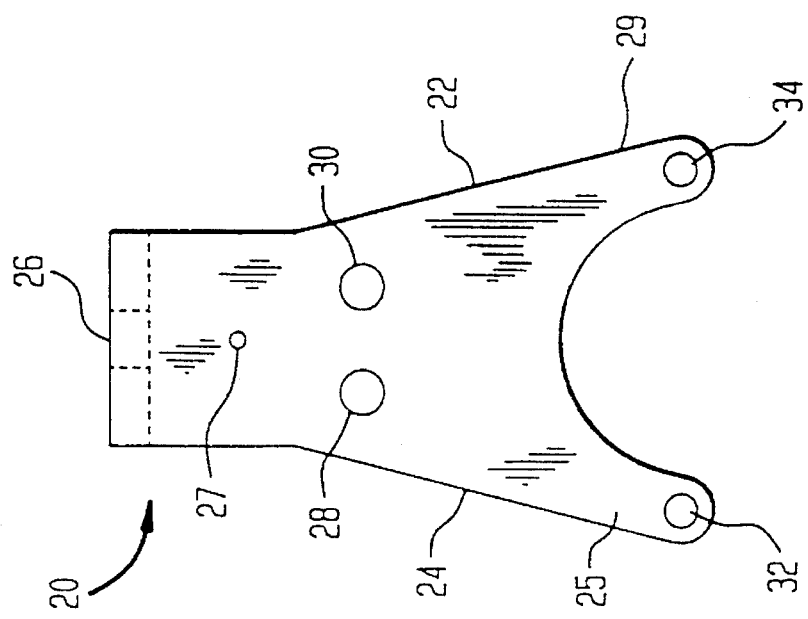
FIG. 3 is a side view of a U-shaped frame of a cable stripper in accordance with the present invention.

As best seen in FIGS. 3–4, cutting element housing 20 is a U-shaped frame, including a hole 26 located in the top portion 36 of U-shaped frame 20. Cutting element housing 20 is symmetrical so that the components which comprise one side of cutting element housing 20 (five holes (27, 28, 30, 32, and 34), a left mounting side 22, and a right mounting side 24) are substantially identical with the corresponding components comprising the opposite side of cutting element housing 20. Therefore, unless otherwise indicated, discussion of each of these elements applies equally to parallel sides 21 and 23 of U-shaped frame 20.

Hole 27 is disposed in side 21 of cutting element housing 20 below upper surface 36 and along an axis perpendicular to that of hole 26. Holes 28 and 30 are located below hole 27, essentially on a line parallel to upper surface 36, with hole 28 adjacent to mounting side 24, and hole 30 adjacent to mounting side 22. Hole 32 is located in the distal end 25 of cutting element housing 20 along mounting side 24. Hole 34 is located in the distal end 29 of cutting element housing 20 along mounting side 22.

As best seen in FIG. 1 and FIG. 5, cutting element housing 20 includes a support block 38. Support block 38 is disposed between parallel sides 21 and 23 of cutting element housing 20. Support block 38 is secured to cutting element housing 20 by four threaded fasteners 44, extending through holes 28 and 30, into four holes 41 located in the sides of support block 38. Support block 38 also includes a hole 40 which is substantially concentric with hole 26 when support block 38 is mounted in cutting element housing 20, and a hole 42 which intersects and is substantially perpendicular to hole 40.

As best seen in FIG. 1, cutting element adjustment assembly 100 is disposed in hole 40 of support block 38 mounted in cutting element housing 20. Cutting element adjustment assembly 100 includes a cutter carrier 102, a hole 104, a plurality of grooves 106, a threaded fastener 108, two bushings 112 and 114, and a threaded fastener 116. Cutter carrier 102 is substantially cylindrical in shape, with a notch 120 disposed in one end, and hole 104 disposed in the other end. A second hole 122 is disposed in cutter carrier 102, perpendicular to and intersecting notch 120. A plurality of grooves 106 is disposed along a portion of the length of cutter carrier 102.

When cutter carrier 102 is disposed in cutting element housing 20, grooves 102 are positioned essentially at 0 degrees and ±30 degrees with respect to hole 42 in support block 38. Threaded fastener 116 extends through hole 42 in support block 38 such that it may be selectively received within one of the plurality of grooves 106 to permit angular adjustment of cutting element 10 with respect to the longitudinal axis of a cable. In addition, threaded fastener 108 extends through hole 26 of upper surface 36 of cutting element housing 20 into hole 104 of cutter carrier 102 such that cutting element 10 may be adjusted vertically with respect to the surface of a cable. Bushing 112 is disposed between threaded fastener 108 and upper surface 36 of cutting element housing 20, and bushing 114 is disposed between threaded fastener 108 and lower surface 37 of cutting element housing 20.

Cutting element 10 is disposed in slot 120 of cutter carrier 102 such that it may contact the surface of a cable that cable stripper 5 is installed on. Cutting element 10 of the cable stripper 5 includes a sharpened wheel 12 and a mounting screw 14. Sharpened wheel 12 may be obtained from Hemp Mfg. Co. as Part No. 3891. Mounting screw 14 extends through hole 122 in cutter carrier 102 to secure wheel 12, and may suitably be a No. 10-32 UNC-2A (MS16996-10).

In order to attach cable stripper 5 to a cable, cutting element guide 50 is employed. Cutting element guide 50 includes a chain 52, a chain tensioner 68, and a slot 90. Chain 52 is connected at one end to side 22 of U-shaped frame 20 via hole 34 and roller pin 67. Chain tensioner 68 is connected to side 24 of U-shaped frame 20 via hole 32 and roller pin 65. Slot 90 is formed in chain tensioner 68 (in roller pin mating plate 74), and can be selectively engaged with chain 52 to form a loop of adjustable diameter to accommodate cables of various diameters.

Chain 52 includes a plurality of chain links 54. Each chain link 54 includes a roller carrier 56, a roller 60, a roller pin 64, and a link side plate 66. Roller pin 64 anchors each roller 60 within each roller carrier 56, away from the outer surface 58 of each roller carrier 56. A link side plate 66 is pressed onto the exposed portion of each installed roller pin 64 to connect each chain link 54 together. Chain 52 of the present invention may suitably include six (6) chain links 54.

Figure 2:
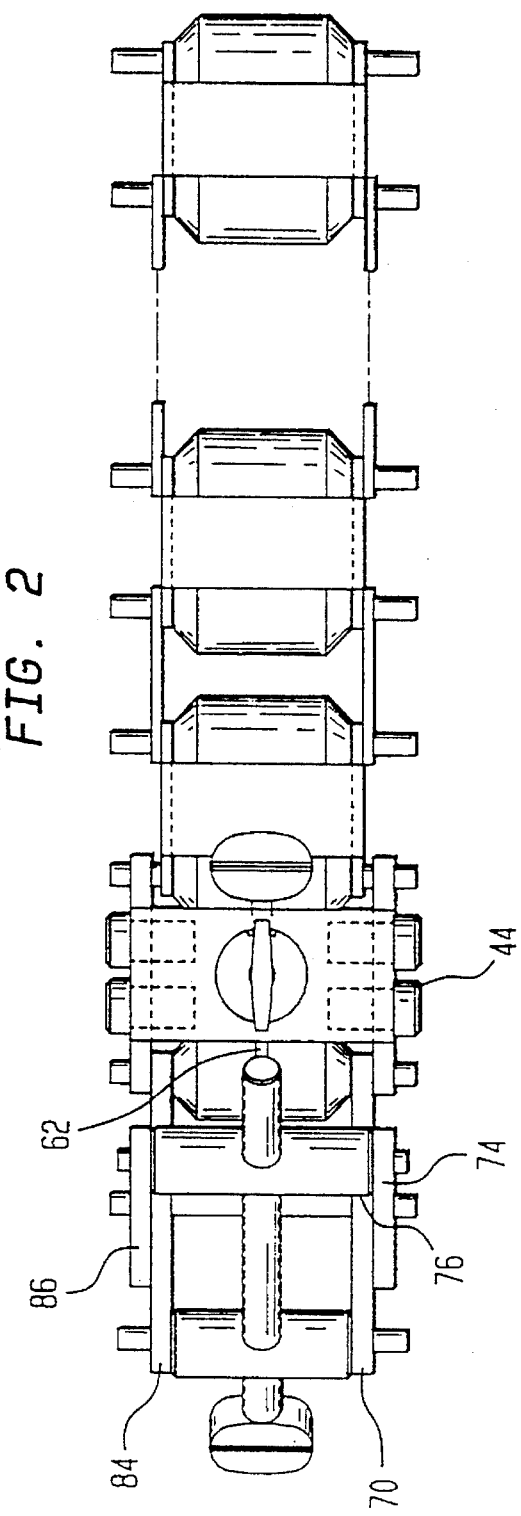
FIG. 2 is a top view of a cable stripper in accordance with the present invention.
Figure 9:
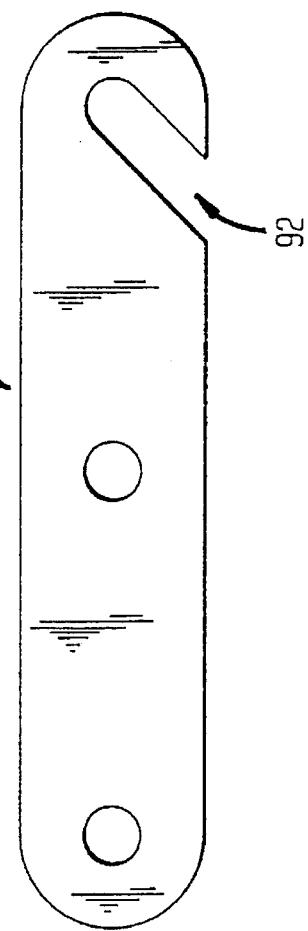
FIG. 9 is a side view of a roller pin mating plate of a chain tensioner in accordance with the present invention.

As best seen from FIG. 2, chain tensioner 68 is symmetrical so that the components which comprise one side (support plate 70, roller pin mating plate 74, roll pin 88, and slot 90) are substantially identical with the corresponding components comprising the opposite side (support plate 84, roller pin mating plate 86, and slot 92 (see FIG. 9)). Therefore, unless otherwise indicated, discussion of each of these elements applies equally to the opposing sides of chain tensioner 68.

Support plate 70 is connected at one end to side 24 of cutting element housing 20 by roller pin 65. Slidable backstop 72 is connected to the other end of support plate 70 by roll pin 88. Roller pin mating plate 74 is pivotally connected to support plate 70 by roller pin 89. Threaded receptacle 76 is connected to one end of roller pin mating plate 74 by roll pin 91. Threaded fastener 78 extends through slidable backstop 72 into threaded receptacle 76. Bushing 82 is disposed between threaded fastener 78 and slidable backstop 72.

With this configuration, support plate 70 and roller pin mating plate 74 will pivot around roller pin 89 when threaded fastener 78 is rotated. Therefore, when slot 90 is engaged with any roller pin 64 of chain 52, this pivoting action can be used to adjust the circumferential length of cutting element guide 50 around the surface of a cable.

Roller pins 64, 65, 67, and 89 may suitably be obtained from McMaster-Carr under Part No. 98381A479. Roll pins 88 and 91 may suitably be obtained from McMaster-Carr under Part No. 98381A471. Bushing 82 may suitably be obtained from Burns Factory Supply under Part No. 3/16 PTO Shaft Col Loc-D. Threaded fastener 78 may be obtained from McMaster-Carr under Part No. 90181A838.

In order to minimize the overall size of cable stripper 5, cutting element housing 20 was designed with distal ends 22 and 24 as close together as practical. Therefore, in order for cutting element 10 to contact the surface of a cable, slotted roller 62 was used at locations 22 and 24.

Cutting element housing 20 also includes a hole 27 disposed in cutting element housing 20 permitting a test probe to be inserted through hole 27 to contact cutting element adjustment assembly 100 and to make a continuity measurement between cutting element adjustment assembly 100 and a conductive cable shield.

To be used, cable stripper 5 is first mounted on a cable by looping chain 52 around the cable and then engaging one of the roll pins 64 with slot 90 of chain tensioner 68. Importantly, cable stripper 5 can be installed at any location along a cable (e.g., mid-span or near an end); wherever cable sheathing is to be removed. Cable stripper 5 is then tightened around the cable by rotating threaded fastener 78 which causes a pivoting action of support plate 70 and roller pin mating plate 74. Next, threaded fastener 108 is rotated until cutting element 10 is forced into the surface of the cable. Cable stripper 5 is then rotated around the cable, making a circular cut in the cable sheathing.

Threaded fastener 108 is then rotated to draw cutting element 10 away from the surface of the cable. Threaded fastener 116 is rotated to permit cutting element adjustment assembly 100 to be rotated in support block 38 until one of the plurality of grooves 102 is in alignment with threaded fastener 116. Threaded fastener 116 is then rotated to secure cutting element adjustment assembly 100 in this angular position. This causes cutting element 10 to be oriented at an angle with respect to the longitudinal axis of the cable. Threaded fastener 108 is again rotated, however this time to force cutting element 10 back into the surface of the cable. Cable stripper 5 is then rotated around the cable, with the angular position of cutting element 10 resulting in a radial cut of the cable sheathing along the longitudinal axis of the cable. The radially cut sheathing may easily be cut off at any desired length.

Where a shielded cable is to be stripped and only the outersheathing is to be removed (e.g., leaving the shielding intact) an additional feature of cable stripper 5 is employed. The same sequence of steps normally followed to remove cable sheathing detailed above is followed, however, with one modification. Each time threaded fastener 108 is rotated to force cutting element 10 into the sheathing of the cable, a continuity measurement is made between cutting element adjustment assembly 100 (via a test probe inserted through hole 27 to contact cutting element adjustment assembly 100) and the shield layer to remain intact. Threaded fastener 108 is rotated until a circuit is formed between cutting element 10 (as determined by the test probe in contact with cutting element adjustment assembly 100) and an individual shield layer, and then backed out slightly. This permits removal of any number of individual layers of outersheathing without also cutting into any particular shield layer.

It is anticipated that the preferred embodiment described above will be most effective in applications requiring removal of cable sheathing of metallic composition. Accordingly, although the Figures show what would typically be considered a metallic sheathing cable stripper, the present invention is equally suited for removing cable sheathing of other compositions.

The preferred embodiment was chosen and described in order to best explain the principles of the present invention and its practical application to thereby enable others skilled in the art to best utilize the invention in various embodiments and with various modifications as are suited to the particular use contemplated.

It is intended that the scope of the present invention be defined by the claims appended hereto, and not by the Figures or the description of the preferred embodiment contained herein.

What is claimed is:

1. A cable stripper, comprising:

a cutting element;

a cutting element housing supporting said cutting element and permitting said cutting element to cut the surface of a cable;

a first hole disposed in said cutting element housing; a support block disposed within said cutting element housing;

a second hole disposed in said support block; and a third hole disposed in said support block which intersects with said second hole;

a cutting element guide having an opening of adjustable diameter for receiving a cable and which forms a loop around said cable; and a cutting element adjustment assembly disposed within said support block, said cutting element adjustment assembly permitting variable adjustment of the depth and angle of said cutting element with respect to said cable while said cable stripper is installed on said cable and whereby a spiral cut can be made along the longitudinal axis of said cable permitting removal of the surface of said cable.

2. A cable stripper according to claim 1, wherein said cutting element comprises a wheel sharpened along its circumference.

3. A cable stripper according to claim 1, wherein said cutting element housing comprises a U-shaped frame for receiving said support block and said cutting element guide is attached to the distal ends of said U-shaped frame.

4. A cable stripper according to claim 1, wherein said cutting element adjustment assembly comprises:

a cutter carrier disposed within said second hole of said support block wherein said cutting element is disposed on one end of said cutter carrier;

a fourth hole disposed in the other end of said cutter carrier;

a plurality of grooves disposed in said cutter carrier along a portion of its length;

a first threaded fastener extending through said first hole of said cutting element housing into said fourth hole of said cutter carrier permitting vertical adjustment of said cutting element with respect to the surface of said cable;

a first bushing disposed between said first threaded fastener and the upper surface of said cutting element housing;

a second bushing disposed between said first threaded fastener and the lower surface of said cutting element housing; and a second threaded fastener extending through said third hole of said support block whereby said second threaded fastener can be selectively received within one of said grooves to permit angular adjustment of said cutting element with respect to the longitudinal axis of said cable.

5. A cable stripper according to claim 4, wherein said first threaded fastener is a thumbscrew and said second threaded fastener is a thumbscrew.

6. A cable stripper according to claim 1, wherein said cutting element guide comprises:

a chain connected at one end of said chain to said cutting element housing for attaching said cable stripper to said cable and for permitting said cable stripper to be rotated around the circumference of said cable;

a chain tensioner connected to said cutting element housing; and a slot formed in said chain tensioner which can be selectively engaged with said chain to form a loop of adjustable diameter to accommodate cables of various diameters.

7. A cable stripper according to claim 6, wherein said cutting element guide further comprises:

a second slot formed in said chain tensioner which can be selectively engaged with said chain to form a loop of adjustable diameter to accommodate cables of various diameters.

8. A cable stripper according to claim 6, wherein said chain comprises a plurality of chain links, each chain link including a roller carrier, a roller, a roller pin rotatably anchoring said roller within said roller carrier to form a chain link, and a link side plate connecting a plurality of said chain links to form said chain.

9. A cable stripper according to claim 8, wherein said chain further comprises a second roller, a second roller pin rotatably anchoring said second roller within said roller carrier to form a chain link, and a second link side plate connecting a plurality of said chain links to form said chain.

10. A cable stripper according to claim 6, wherein said chain tensioner comprises:
   a support plate connected at one end to said cutting element housing;
   a slidable backstop connected to the other end of said support plate;
   a roller pin mating plate pivotally connected to said support plate;
   a threaded receptacle connected to one end of said roller pin mating plate;
   a third threaded fastener extending through said slidable backstop into said threaded receptacle; and
   a third bushing disposed between said third threaded fastener and said slidable backstop.

11. A cable stripper according to claim 10, wherein said chain tensioner further comprises:
   a second support plate connected at one end to said cutting element housing and at the other end to said slidable backstop, with said slidable backstop bridging said first support plate and said second support plate; and
   a second roller pin mating plate pivotally connected to said second support plate and connected at one end to said threaded receptacle, with said threaded receptacle bridging said first roller pin mating plate and said second roller pin mating plate.

12. A cable stripper according to claim 10, wherein said third threaded fastener is a thumbscrew.

13. A cable stripper according to claim 1, wherein said cutting element housing further comprises a fifth hole disposed in said cutting element housing permitting a test probe to be inserted through said fifth hole to contact said cutting element adjustment assembly and to make a continuity measurement between said cutting element adjustment assembly and a cable shield.

14. A cable stripper comprising:
   a cutting element;
   a cutting element housing supporting said cutting element and permitting said cutting element to cut the surface of a cable;
   a hole disposed in said cutting element housing for permitting an electrical connection between said cutting element and a test probe whereby an electrical circuit can be formed between said cutting element and a metallic cable shield;
   a cutting element guide having an opening of adjustable diameter for receiving a cable and which forms a loop around said cable; and
   a cutting element adjustment assembly, disposed within said cutting element housing, permitting variable adjustment of the depth of said cutting element with respect to the surface of said cable.

15. A cable stripper comprising:
   a cutting element;
   a cutting element housing supporting said cutting element and permitting said cutting element to cut the surface of a cable;
   a cutting element guide having an opening of adjustable diameter for receiving a cable;
   a cutting element adjustment assembly, disposed within said cutting element housing, permitting variable adjustment of the depth of said cutting element with respect to the surface of said cable; and
   a, hole disposed in said cutting element housing for permitting a test probe to be inserted through said hole to contact said cutting element adjustment assembly to make a continuity measurement between said cutting element adjustment assembly and a metallic cable shield.

16. A cable stripper according to claim 14, wherein said means for permitting an electrical connection to be made between said cutting element and said test probe is a hole formed in said cutting element housing.

17. A cable stripper according to claim 6, wherein said cutting element housing comprises a U-shaped frame and said cutting element guide is attached to distal ends of said U-shaped frame.

18. A cable stripper according to claim 15, wherein said cutting element comprises a wheel sharpened along its circumference.

* * * * *